(12) United States Patent
Stahl

(10) Patent No.: US 7,068,920 B1
(45) Date of Patent: Jun. 27, 2006

(54) DIGITAL BASEBAND INTERFACE FOR A DVD PLAYER

(75) Inventor: Thomas Anthony Stahl, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/582,386

(22) PCT Filed: Feb. 4, 1999

(86) PCT No.: PCT/US99/02498

§ 371 (c)(1),
(2), (4) Date: Nov. 10, 2000

(87) PCT Pub. No.: WO99/40720

PCT Pub. Date: Aug. 12, 1999

Related U.S. Application Data

(60) Provisional application No. 60/073,696, filed on Feb. 4, 1998.

(51) Int. Cl.
*H04N 5/91* (2006.01)

(52) U.S. Cl. .................................. 386/125; 386/126
(58) Field of Classification Search ................ 386/46, 386/95, 96, 98, 111, 112, 125, 126, 70; 341/50
See application file for complete search history.

(56) References Cited

U.S. PATENT DOCUMENTS 5,995,161 A * 11/1999 Gadre et al. ............... 348/564
5,995,709 A * 11/1999 Tsuge ......................... 386/95
5,999,698 A * 12/1999 Nakai et al. ................ 386/125
6,031,963 A * 2/2000 Kitamura et al. ........... 386/109
6,211,800 B1 * 4/2001 Yanagihara et al. ......... 341/50
6,233,393 B1 * 5/2001 Yanagihara et al. ........ 386/125
6,351,599 B1 * 2/2002 Komeno ..................... 386/70
6,507,696 B1 * 1/2003 Chung et al. ............... 386/125
6,665,020 B1 * 12/2003 Stahl et al. .................. 348/552

FOREIGN PATENT DOCUMENTS

| EP | 701367 | 3/1996 |
|---|---|---|
| EP | 703713 | 3/1996 |
| EP | 737009 | 10/1996 |
| EP | 785675 | 7/1997 |
| EP | 833514 | 4/1998 |
| EP | 873009 | 10/1998 |
| WO | 97/05743 | 2/1997 |
| WO | 97/10678 | 3/1997 |
| WO | 97/33433 | 9/1997 |
| WO | 99/14945 | 3/1999 |
| WO | 99/14946 | 3/1999 |

* cited by examiner

*Primary Examiner*—Huy Nguyen
(74) *Attorney, Agent, or Firm*—Joseph J. Laks; Robert D. Shedd; Paul P. Kiel

(57) ABSTRACT

Managing interoperability of digital devices such as a digital video disc player and a digital television interconnected via a digital bus is provided. This interoperability is based on the IEEE 1394 serial bus for the physical and link layers and makes use of AV/C or CAL as the control language. This invention provides for transferring a DVD subpicture that has been transformed into a bit-mapped on-screen display (OSD) format via an asynchronous channel of the interconnecting serial bus.

11 Claims, 3 Drawing Sheets

DIGITAL BASEBAND INTERFACE FOR A DVD PLAYER

This application claims the benefit of Provisional Application 60/073,696, filed Feb. 4, 1998

FIELD OF THE INVENTION

This invention concerns a method for managing the interoperability of digital devices such as a digital video disc player and a digital television interconnected via a digital bus. More particularly, the invention involves a system for processing digital video disc (DVD) subpictures by a digital television.

BACKGROUND OF THE INVENTION

Video signal processing systems that utilize storage media having digitally compressed video and audio information recorded thereon include, amongst other devices, a digital video disc player adapted to process information stored in accordance with the digital video disc (DVD) specification. The information on a DVD formatted disc is recorded as discrete packets of data, in accordance with the applicable video and audio data compression standards, wherein designated packets carry data associated with various data streams, such as alternative video angles, audio tracks, subpicture streams and navigation information. A video disc player reading a DVD formatted disc may be controlled to display certain packets of data and skip over others. A single disc may be authored to allow playback of multiple camera angles, story endings, scenes according to a ratings content, etc. DVD subpictures are used as the graphical user interface (GUI) for such features as providing the user the ability to select from one of several different videos on a disc. Using this capability, the DVD system can be used to prevent unauthorized access to information on a particular disc as well as seamlessly provide multiple variations of a video title in accordance with user commands. Current DVD players mix the decoded subpicture information with the decoded video into a single analog video signal for transport to a television.

A device such as a DVD player may be coupled to other devices, such as a display device, a video/audio recording device, audio equipment and communicate with these other devices via a data bus. Such communication occurs in accordance with a bus protocol. Examples of bus protocols include the Consumer Electronics Bus (CEBus) and the IEEE 1394 High Performance Serial Bus. A bus protocol typically provides for communicating both control information and data. For example, CEBus control information is communicated on a "control channel" having a protocol defined in Electronics Industries Association (EIA) specification IS-60. On an IEEE 1394 serial bus, control information is generally passed using the asynchronous services of the serial bus. Control information for a particular application can be defined using a programming language such as for example, Common Application Language (CAL) or AV/C.

SUMMARY OF THE INVENTION

This invention resides, in part, in the inventor's recognition of the below mentioned problems associated with processing the DVD subpictures and navigation control in the digital television. Today, digital video disc (DVD) players process digitally compressed video and audio information stored in accordance with the digital video disc (DVD) specification. This processing includes the conversion of the compressed digital stream to a standard signal (e.g., an NTSC or PAL signal). A remote control device or the front panel of the DVD player is used to produce a "quasi-interactive" program. That is, in response to a user command, a DVD subpicture is generated and combined with the decoded program stream prior to converting the digital stream to an NTSC signal. The DVD subpicture may be thought of as a menu identifying available user initiated options. Navigation through the program is achieved in response to selection of one of these options. Thus navigation information may be thought of as logic that is executed in response to the selection of one of the available options identified in the DVD subpicture.

Video decoding could be performed in a digital apparatus, for example, a digital television (DTV) or digital set-top box, however, it is difficult and expensive to mix the subpicture data with the video in the DVD player prior to transport to the digital apparatus. For simplicity and convenience of comprehension, the remaining discussion of the present invention will encompass the utilization of a digital television although this invention is equally applicable for use with a digital set-top box. At present, DTVs do not support run-length encoded format that is used for DVD subpictures. The advent of digital television receivers eliminates the burden of converting the digital stream produced in a digital video disc player to an NTSC signal, thereby creating a unique ability to harness the benefit of the digital signal by processing the digital stream within the digital television. However, the additional requirement of decoding DVD subpictures and interpreting DVD navigation information in the digital television would greatly increase the cost and complexity of the digital television. This invention also resides, in part, in providing an apparatus and method for solving the described problems.

The present invention provides for receiving, in a digital television, bit-map digital data representative of a DVD subpicture and combining the bit-map digital data with a decoded content stream received from the DVD disc. Particularly, the present invention provides a digital video signal processing apparatus and method for receiving from a digital video disc player a program content stream representative of a programmed event; decoding the program content stream to generate a signal suitable for display; receiving from the digital video disc player digital data suitable for display associated with the program content stream; and combining the digital data received from the digital video disc player and the program content stream to produce a signal representative of a combined image suitable for display. The program content stream comprises data configured in a compressed format.

Another aspect of the present invention provides for receiving subsequent displayable digital data representative of an updated portion of the previously received digital data; and updating the combined displayable image with the received subsequent displayable data to produce an updated combined displayable image. The step of updating being responsive to user input received by the digital video disc player.

Yet another aspect of the present invention provides for a system for controlling a digital video disc player interconnected by a digital bus to a digital television. Particularly, the digital video disc player processes a program content stream of a digitally compressed format received from a digital video disc received in a digital video disc player to generate an audio/video program stream and a subpicture stream;

transmits the audio/video program stream to the digital television via an isochronous channel of the digital bus; processes the subpicture stream to generate displayable digital data (e.g., bit-map OSD); and transmits the displayable digital data to the digital television via an asynchronous channel of the digital bus.

BRIEF DESCRIPTION OF THE DRAWINGS

The invention may be better understood by referring to the enclosed drawing in which.

Figure 1:
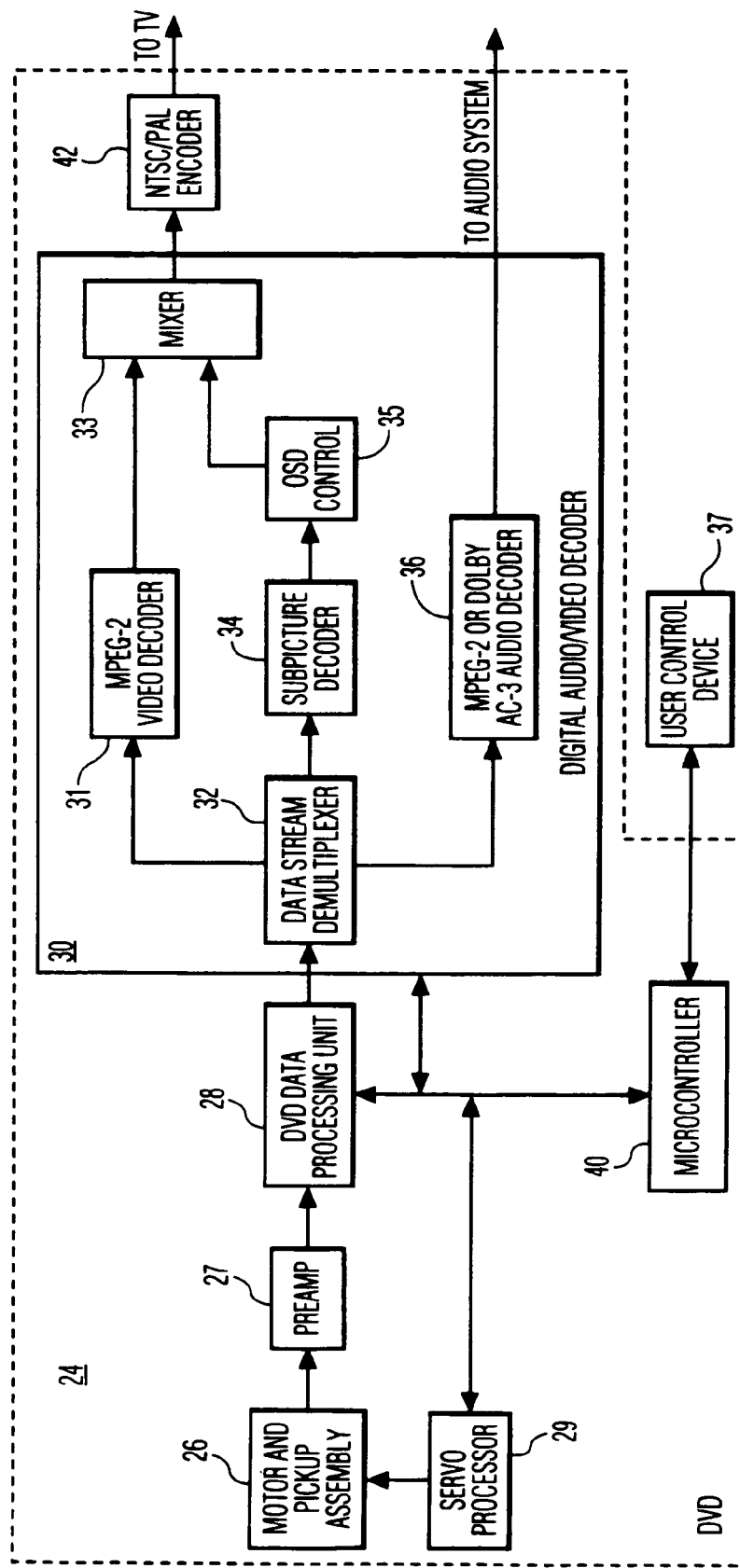
FIG. 1 shows, in simplified block-diagram form, a typical digital video disc player.

In the drawings, reference numerals that are identical in different figures indicate features that are the same or similar.

DETAILED DESCRIPTION OF THE DRAWINGS

The use of IEEE 1394 serial bus has been suggested for many applications within a Home Network environment. It is being discussed within Video Electronics Standards Association (VESA) for use as a "whole home network." It is being built into the next generation PCs and will be used for many local peripherals including disc drives as well as digital audio/video consumer electronic devices such as digital televisions (DTVs) and digital video disc (DVD) players.

IEEE-1394 is a high speed, low cost digital serial bus developed for use as a peripheral or back-plane bus. Some of the highlights of the bus include: dynamic node address assignments, data rates of 100, 200, and 400 Mbits/sec, asynchronous and isochronous modes, fair bus arbitration, and consistency with ISO/IEC 13213.

FIG. 1 is a block diagram showing the basic elements of a typical digital video disc (DVD) player 24. The construction and operation of these elements are known to one of ordinary skill in the art and will not be discussed in detail here. Disc player 24 comprises motor and pickup assembly 26 which, under the control of servo processor 29, spins the disc and reads the information stored thereon. Preamp 27 and DVD data processing unit 28 translate the electrical pulses from motor and pickup assembly 26 into digital data that can be further processed by digital audio/video decoder unit 30. DVD data processing unit 28 typically performs functions such as demodulation, error correction and descrambling of the raw data read from the disc so that the data is in a suitable format for decoder unit 30. Error correction may involve data processing such as that associated with a Reed Solomon algorithm.

Decoder unit 30 receives the demodulated, error corrected and descrambled data, processes the data, and provides the appropriate video and audio signals to a display unit, such as a NTSC television set. Particularly, decoder unit 30 comprises data stream demultiplexer 32 which demultiplexes the data from data processing unit 28 into a plurality of separate data streams, including a video stream, an audio stream and a subpicture stream, and provides the data streams to their respective data decoders. Video decoder 31 receives the video stream and provides a video signal to mixer 33. Subpicture decoder 34 receives the subpicture stream and provides data to on screen display (OSD) control 35 which provides OSD video signals to mixer 33. The combined video signal from mixer 33 is provided to NTSC/PAL encoder 42 which provides a video signal that conforms to the appropriate video signal standard to a video display device, such as an NTSC television. Audio decoder 36 receives the audio streams from data stream demultiplexer 32 and provides the appropriate audio signals to an audio system.

Microcontroller 40 controls the operation of digital video disc player 24. Microcontroller 40 is coupled to user control device 37, which may comprise IR remote control devices, front panel buttons or the like, and translates data from user control device 37 to control the operation of the various elements of disc player 24 described above. Typically, microcontroller 40 is also configured to control various access features of disc player 24 including, but not limited to, parental lock out, descrambling or decryption information and navigation data. Microcontroller 40 may be embodied in various forms, including, but not limited to, a dedicated integrated circuit, or a part of a decoder/controller unit.

The combined video signal generated by mixer 33 may be forwarded to the digital television via an IEEE 1394 digital bus. Unfortunately, the through-put of the decoded and uncompressed video signal may degrade system operation due to the band width requirement of transferring such a video signal via a IEEE 1394 digital bus, for example, 30 frames/second×720 horizontal pixels×480 vertical pixels× 24 bits/pixel=250 Mbits/second. The band width for present IEEE 1394 serial buses is typically limited to 200 Mbits/ second. Even with a 400 Mbit/second serial bus, after subtracting the band width necessary for overhead, transferring such decoded and uncompressed video signals would be difficult. For comparison purposes, such a bandwidth correlates to about one-sixth the size of a decoded HDTV signal. As described in further detail below, the present invention resides in part in recognition of this problem, and in part, in identifying a solution thereto.

Figure 2:
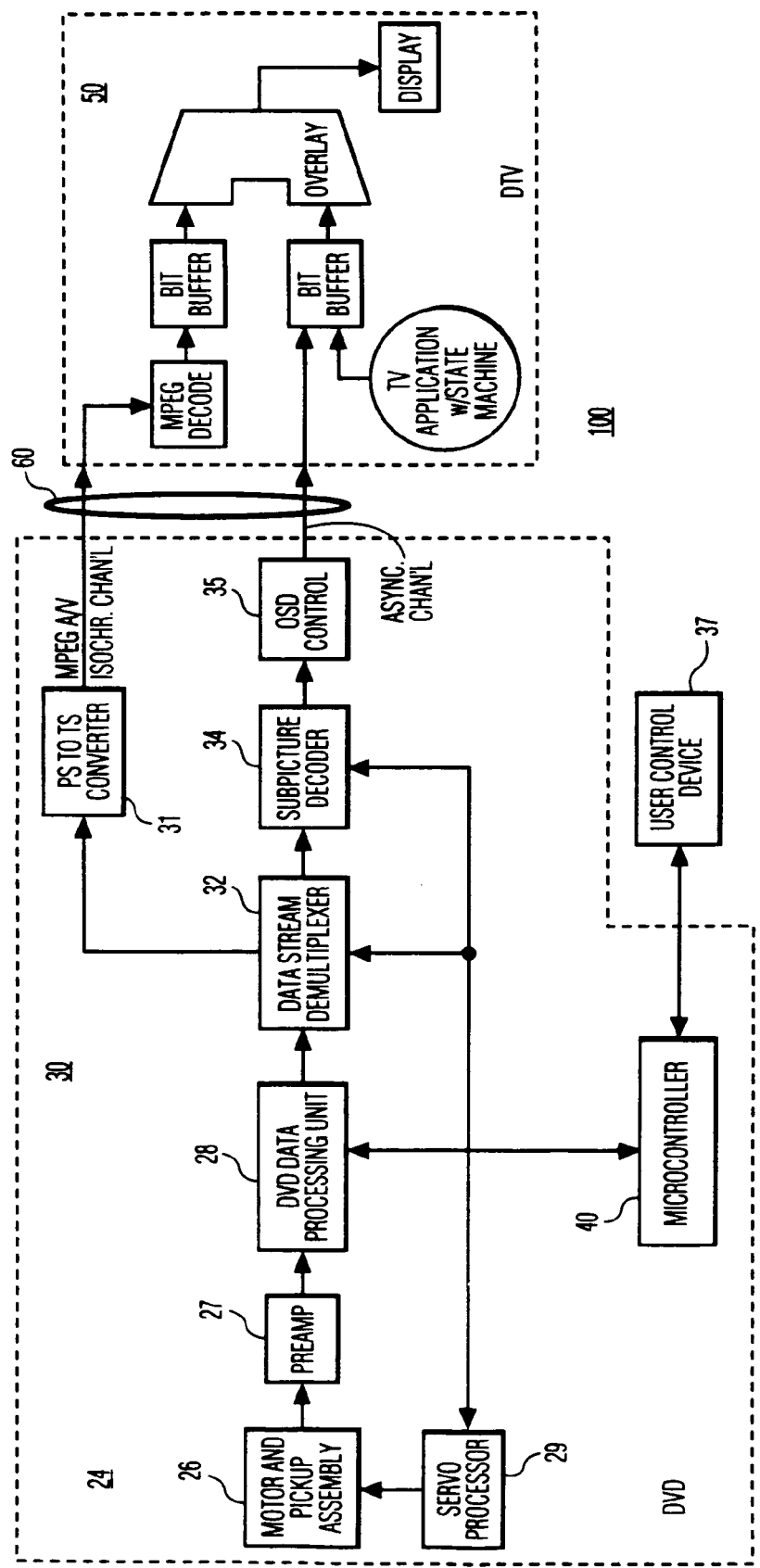
FIG. 2 shows, in simplified schematic block-diagram form, a system illustrating the interoperability of the digital video disc player of FIG. 1 employing the present invention.

Today's digital televisions provide many benefits for digital video processing. FIG. 2 defines a system 100 for providing interoperability between DVD player 24 and digital television (DTV) 50 via an IEEE 1394 serial bus 60. In such a system 100, interoperability may be achieved by transferring the compressed MPEG stream from DVD player 24 to an MPEG decoder integral with DTV 50. Transferring DVD subpictures from DVD player 24 to a DTV 50 can be achieved using one of several formats. For example, a subset of HTML without the navigation features may be used to describe the OSD. Another possibility is to use a run-length-encoding format which is similar to the DVD subpicture format. However, the preferred embodiment involves transferring the actual information in an OSD bit-map format. For example, an 8 bit/pixel, full screen, 640×480 OSD can be transferred in about 100 msecs utilizing 10% of the bandwidth of the 200 Mbit/sec IEEE 1394 serial bus.

Converting DVD subpictures to an OSD bit-map format and transferring the OSD bit-map subpicture directly from DVD player 24 to DTV 50 via an asynchronous channel of serial bus 60, for example, utilizing a "Pull" method, is described below. DVD player 24 processes the digitally compressed video and audio information stored on the video disc thereby generating a digital stream in an MPEG-PS (program stream) format. In one embodiment of the present invention the MPEG-PS stream is first converted to an MPEG-TS (transport stream) format by PS to TS Converter 39. The MPEG-TS audio/video digital stream is transferred to DTV 50 utilizing an isochronous channel of IEEE 1394 serial bus 60. The OSD bit-map subpicture is not transferred as a composite compressed MPEG video stream but is transferred as a bit-mapped OSD where the OSD may be overlayed in DTV 50 with the decoded MPEG audio/video stream prior to being displayed.

Transferring compressed MPEG-TS data via the digital bus eliminates the throughput and processing problems. The digital television may contain an MPEG Audio/Video Decoder which will be utilized for decoding the MPEG-TS stream. The user will still directly interface with DVD player 24 utilizing the respective user control device 37 (i.e., front panel or remote control). The responses of such user interaction is handled within DVD player 24 by decoding the MPEG sub-pictures and generating a bit-map subpicture OSD. The bit-map OSD may be transferred via an asynchronous channel of IEEE 1394 serial bus 60 to the OSD buffer located in DTV 50. The bit-mapped image is overlayed, within the digital television, with the decoded video MPEG signal. The combined (or overlaid) signal is then displayed.

Figure 3:
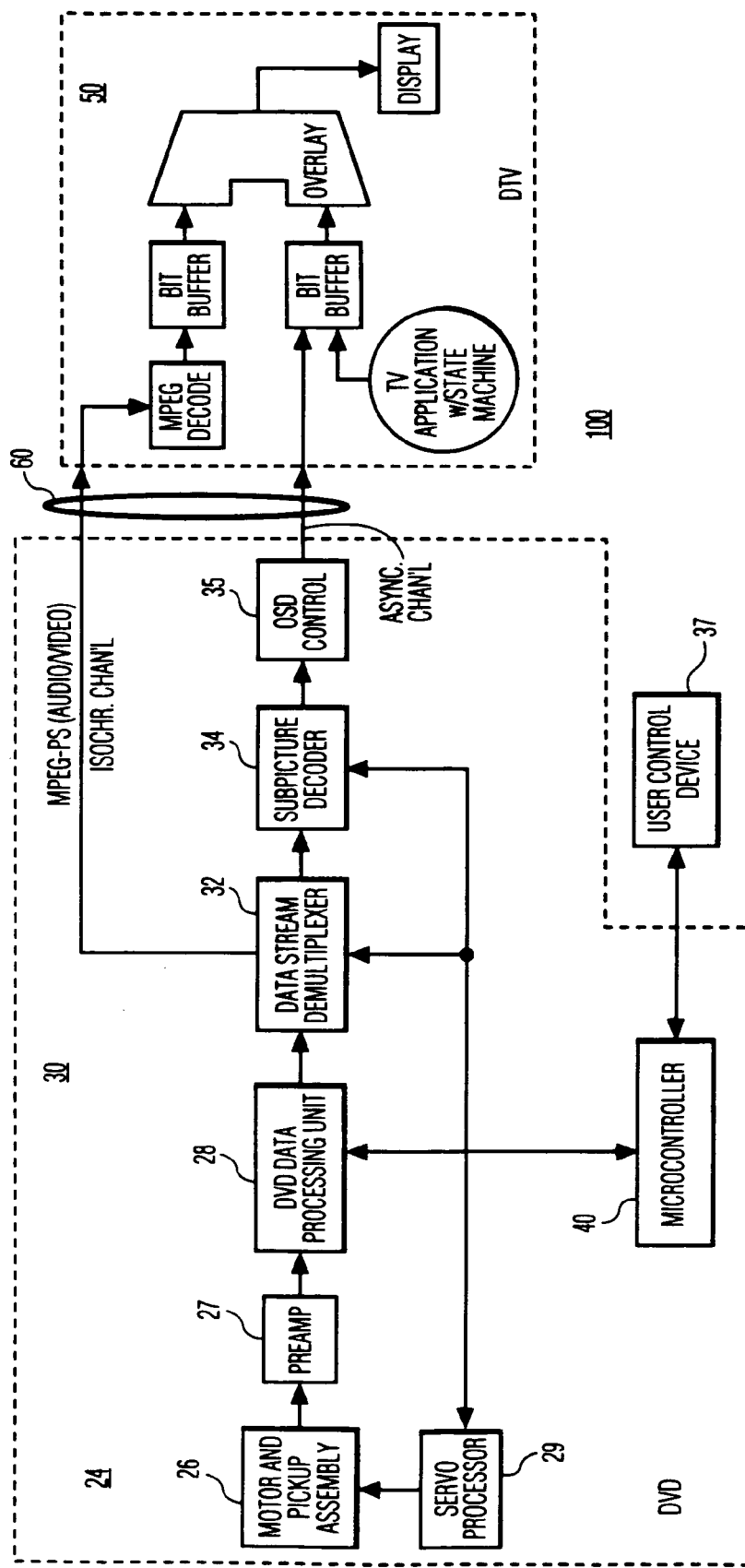
FIG. 3 shows, in simplified schematic block-diagram form, an alternate embodiment of the system shown in FIG. 2.

FIG. 3 shows an alternate embodiment of the present invention wherein the MPEG-PS stream is directly decoded by the MPEG decoder in the DTV. MPEG-PS streams require less processing power than MPEG-TS streams; thus broadcast decoders with sufficient packet buffers that utilize software for demultiplexing could be programmed to directly decode MPEG-PS streams. Thus, PS to TS Converter 39 is not required. The audio/video content stream in an MPEG-PS format is transferred over an isochronous channel of IEEE 1394 serial bus 60 to an MPEG decoder in DTV 50.

Utilizing a bit-map format for transfer of DVD subpictures allows (1) the DVD manufacturer to maintain the "look and feel" of the subpicture, (2) for freedom in the generation of the subpicture and (3) for dynamic updates (i.e. partial screen or even single pixel updates are possible). Compared to compressed representations, the bit-map representation requires less processing time to display because displaying such bit-mapped subpictures requires minimal interpretation and manipulation. Descriptive approaches, such as HTML, have a disadvantage of being difficult to specify and upgrade for typical consumer products.

To simplify the transfer of bit-mapped subpictures, a "Pull" method is preferably utilized. With this method, the bulk of the bit-map data is transferred from DVD player 24 to DTV 50 using the asynchronous channel of the IEEE 1394 digital bus. DTV 50 reads the bit-map data from the memory of the peripheral device (i.e., DVD player) by making use of at least one block read transaction of IEEE 1394. The display device is informed of the location and size of the bit-map data via a "trigger" command which is sent from DVD player 24 to DTV 50 when the DVD player 24 is ready to begin transferring data.

Other alternatives for transferring subpictures from DVD player 24 to DTV 50 include; (1) an asynchronous push method which primarily uses IEEE 1394 asynchronous write transactions initiated by DVD player 24 to write the bit-map data into DTV 50, (2) an isochronous transport method for broadcasting the bit-map data over one of the isochronous channels provided by IEEE 1394, (3) an asynchronous stream method for carrying the subpictures and (4) alternately, the bit-map data could be provided via a 8 VSB-T (trellis) or 16 VSB RF remodulated channel.

Once the subpicture is ready for transfer, DVD 24 sends a trigger message to DTV 50. A unique trigger message 22 may be utilized for each subpicture. Initiation of a block transfer usually occurs through the use of a trigger message from DVD 24 to DTV 50. A queue may be implemented in the display device so that trigger messages are processed in the same order in which they are received.

After a trigger message is received from the target, the OSD module in DTV 50 requests memory accesses (i.e., asynchronous reads) starting at the memory location specified in the trigger message. The display device reads all of the information associated with the subpicture and begins to construct the actual bit-map image. At the same time, it informs DVD 24 that the block has been read so that DVD 24 may free up any memory it had allocated to the transfer of this data block. This subpicture is then displayed. DTV's 50 OSD controller (not shown) uses this data to construct the OSD and mix it with the decoded MPEG video in DTV 50.

The time required for transfer of bit-map data through the digital bus may be calculated as follows. For example all the data required for a 640×480 OSD with 4 bits/pixel requires 1,228,800 bits. All of this data can be transferred in about 150 ms assuming a 100 Mb/sec bus, a packet payload of 512 Bytes and assuming that we can transmit one packet each 500 μsec. This time decreases even further when one takes into account that no OSD takes up this much space. Using only a quarter (typical) of the entire screen results in roughly 40 ms transfer time. Small updates can be on the order of a few milliseconds.

Application Control Languages

In order for a consumer electronic device to interact with other devices interconnected via a IEEE 1394 serial bus, a common set of commands must be defined. Three standard approaches for device modeling and control are CAL, AV/C and the approach adopted for the Universal Serial Bus (USB).

The design of control languages is based on the assumption that all consumer electronic products have a hierarchical structure of common parts or functions. CAL and AV/C are control languages that distinguish between logical and physical entities. For example, a television (i.e., a physical entity) may have a number of functional components (i.e., logical entities) such as a tuner, audio amplifier, etc. Such control languages provide two main functions: Resource allocation and Control. Resource allocation is concerned with requesting, using and releasing Generic Network resources. Messages and control are transported by the FCP as defined in IEC-61883 and discussed above. For example, CAL has adopted an object base methodology for its command syntax. An object contains and has sole access to a set number of internal values known as instance variables (IV). Each object keeps an internal list of methods. A method is an action that an object takes as a result of receiving a message. When a method is invoked, one or more IVs are usually updated. A message may include a method identifier followed by zero or more parameters. When an object receives a method, it looks through its list of methods for one which matches the method identified in the message. If found, the method will be executed. The parameters supplied with the message determine the exact execution of the method.

For a CAL implementation, all devices that are capable of displaying OSDs must implement the following OSD object. This object assumes Asynchronous PULL with trigger message approach. This object would be carried in the trigger message from DVD 24 to DTV 50. Digital television 50 would then pull the menu by reading it from DVD's 24 bus mapped memory space. The response of this request will be used by DVD 24 as an indication that the display device has read these update blocks.

| OSD Update Trigger Object | | | | |
|---|---|---|---|---|
| 2 | OSD Update Trigger Object | | | (16) Data Memory |
| The object is used for triggering the OSD mechanism in display capable devices. | | | | |
| IV | R/W | Type | Name | Context Function |
| a (61) | R | Numeric | size_of_block | size of "memory_block" in bytes (default value = 10) |
| b (62) | R | Numeric | length_of_record | length of current_record in bytes (default value = 10) |
| C (43) | R/W | Numeric | current_index | current record block pointed to (default value = 0) |
| 1 (6C) | R/W | Data ( ) | memory_block | in each record, 6 MSBs contain the offset and LSB contains the OSD_type; remaining 3 bytes represent the length of OSD in bytes. |

Although the exemplary embodiment is described with reference to a digital video apparatus adapted to read compressed video and audio data from a disc and to process the data in accordance with the DVD specification, it is to be understood that the present invention may be used in any video processing apparatus capable of processing digital video and audio information, wherein program related information included with the video and audio information can be used to selectively restrict the playback of certain video and audio information on the disc.

While the invention has been described in detail with respect to numerous embodiments thereof, it will be apparent that upon a reading and understanding of the foregoing, numerous alterations to the described embodiment will occur to those skilled in the art and it is intended to include such alterations within the scope of the appended claims. For example, the invention has been described with respect to DVD players, however this invention is equally applicable to any digital device processing at least one stream of compressed digital data.

What is claimed:

1. A method for operating a digital video processing apparatus interconnected by a digital bus to a digital video disc player, the digital video processing apparatus performing the steps of:
    (a) receiving from said digital video disc player, via said digital bus, a program content stream representative of a video program stored on a disk coupled to said digital video disc player, said program content stream including data in a compressed format, said program content stream being received via a first type of transfer mechanism;
    (b) decoding said program content stream in said digital video processing apparatus;
    (c) receiving from said digital video disc player, via said digital bus, bit-map data representative of a subpicture associated with said program content stream and enabling user navigation through the video program, said bit-map data being suitable for display, said bit-map data being received via a second type of transfer mechanism; and
    (d) combining, in said digital video processing apparatus, said bit-map data received from said digital video disc player and said decoded program content stream to produce a signal representative of a combined image suitable for display.

2. The method of claim 1 further comprising the digital video processing apparatus performing the steps of:
    (a) receiving subsequent bit-map data representative of an updated portion of said previously received subpicture; and
    (b) updating, in response to a user initiated command received by said digital video disc player, said combined image with said received subsequent bit-map data to produce an updated combined image suitable for display.

3. A digital television comprising:
    (a) means for receiving from a digital data processing apparatus having a storage means, via a digital bus interconnecting said digital television and said digital data processing apparatus, a compressed digital data stream representative of a video program stored on said storage means, said compressed digital data stream being received via a first type of transfer mechanism;
    (b) means for decoding said compressed digital data stream in said digital television;
    (c) means for receiving from said digital data processing apparatus, via said digital bus, bit-map data representative of a subpicture associated with said compressed digital data stream and enabling user navigation through the video program, said bit-map data being received via a second type of transfer mechanism; and
    (d) means for combining, in said digital television, said bit-map data received and said decoded compressed digital data stream to produce a signal representative of a combined image suitable for display.

4. The digital television of claim 3 further comprising:
    (a) means for receiving subsequent bit-map data representative of an updated portion of a previously received bit-map data; and
    (b) means for updating said combined image with said received subsequent bit-map data to produce an updated combined image suitable for display, wherein said updating means is responsive to user input.

5. A method for operating a digital video disc player interconnected by a digital bus to a digital television, the digital video disc player performing the steps of:
- (a) receiving from a digital video disc coupled to said digital video disc player an MPEG-PS digital stream representative of a video program;
- (b) converting said digital stream from an MPEG-PS format to a digital stream having an MPEG-TS format;
- (c) transmitting said MPEG-TS digital stream to said digital television via an isochronous channel of said digital bus;
- (d) processing a subpicture stream associated with said MPEG-PS digital stream, and enabling user navigation through the video program, to generate a bit-mapped digital data suitable for display; and
- (e) transmitting said bit-mapped digital data to said digital television via an asynchronous channel of said digital bus.

6. The method of claim 5 further comprising the steps of:
- (a) receiving a user initiated command in response to said displayed bit-mapped digital data;
- (b) generating an updated subpicture stream in response to said user initiated command;
- (c) processing said updated subpicture stream to generate an updated bit-mapped digital data; and
- (d) transmitting said updated bit-mapped digital data.

7. The method according to claim 1, wherein said digital bus comprises an IEEE 1394 compliant bus said first type of transfer mechanism is an isochronous transfer mechanism and said second type of transfer mechanism is an asynchronous transfer mechanism.

8. The digital television according to claim 3, wherein said digital bus comprises an IEEE 1394 compliant bus said first type of transfer mechanism is an isochronous transfer mechanism and said second type of transfer mechanism is an asynchronous transfer mechanism.

9. A method for operating a digital video disc player interconnected by a digital bus to a digital video processing apparatus, the digital video disc player performing the steps of:
- (a) retrieving from a storage device coupled to said digital video disc player a program content stream representative of a video program stored on said storage device, said program content stream including data in a compressed format;
- (b) formatting the program content stream for transfer via a first type of transfer mechanism of said digital bus and transferring the formatted program content stream to the digital video processing apparatus via said first type of transfer mechanism of said digital bus;
- (c) retrieving from said storage device subpicture information associated with said program content stream and enabling user navigation through the video program, said subpicture information comprising data in a compressed format;
- (d) processing the subpicture information to generate bit map data representing the subpicture information; and
- (e) transferring the bit map data to the digital video processing apparatus via a second type of transfer mechanism of said digital bus.

10. The method of claim 9 further comprising the steps of:
- (a) generating, in response to a receipt of a user initiated command, subsequent bit-map data representative of an updated portion of a previously transferred subpicture; and
- (b) transferring said subsequent bit map data to said digital video processing apparatus via said digital bus.

11. The method of claim 9, wherein the first type of transfer mechanism is an isochronous transfer mechanism, and the second type of transfer mechanism is an asynchronous transfer mechanism.

* * * * *